United States Patent [19]

Blomqvist

[11] Patent Number: 4,613,788
[45] Date of Patent: Sep. 23, 1986

[54] ARRANGEMENT IN A TUNABLE HIGH FREQUENCY TRANSMITTER TUBE

[75] Inventor: Klas I. Blomqvist, Järfälla, Sweden

[73] Assignee: U.S. Philips Corporation, New York, N.Y.

[21] Appl. No.: 601,517

[22] Filed: Apr. 18, 1984

[30] Foreign Application Priority Data

Apr. 29, 1983 [SE] Sweden ................ 8302434

[51] Int. Cl.⁴ .............................................. H01J 25/50
[52] U.S. Cl. .............................. 315/39.61; 315/39.55; 331/90
[58] Field of Search ................... 315/39.55, 39.61; 331/90

[56] References Cited

U.S. PATENT DOCUMENTS

| | | | |
|---|---|---|---|
| 2,481,171 | 9/1949 | Spencer | 315/39.61 |
| 2,506,955 | 5/1950 | Fracassi | 315/39.61 |
| 2,542,908 | 2/1951 | Derby | 315/39.61 |
| 3,548,312 | 12/1970 | Strom et al. | 325/131 |
| 3,590,313 | 6/1971 | Stoke | 315/39.61 |
| 3,876,903 | 4/1975 | Landau | 315/39.61 |
| 4,527,094 | 7/1985 | Gerard et al. | 315/39.61 |

FOREIGN PATENT DOCUMENTS

| | | | |
|---|---|---|---|
| 0072606 | 3/1982 | European Pat. Off. | 74/150 |
| 0400037 | 10/1933 | United Kingdom | 315/39.55 |

*Primary Examiner*—Saxfield Chatmon
*Attorney, Agent, or Firm*—Robert J. Kraus

[57] ABSTRACT

An arrangement for transmission of a predetermined fixed frequency by means of a tunable high frequency transmitter tube, such as a magnetron, the tuning of which can be varied periodically by means of a rotatable tuning body driven by a motor. The arrangement comprises a locking hook (22) which is pivotably mounted on a part connected to the rotatable tuning body and cooperates with a stationary locking disc (11), having a locking notch (14) with a stop surface (15). The locking hook (22) cooperates with spring means (28, 30) urging the active end of the locking hook towards the stationary locking disc (11). The locking hook (22) has furthermore a counterweight (35) situated at the opposite side of its rotation axis (23) as compared with the active end. When the tuning is varied, the tuning body is rotated in its normal rotation direction, in which case the counterweight (35) will overcome the force from the spring means (28, 30) so that the locking hook (22) is swung to a position in which it is free from the locking disc (11). When a predetermined fixed frequency is to be transmitted the motor is reversed, whereby the locking hook (22) under influence of the spring means (28, 30) is swung with its active end towards the stationary locking disc (11) with the locking notch (14). After reversion of the rotation direction the locking hook (22) engages the locking notch (14) and locks the tuning body in a position determined by the angular position of the locking notch (14).

2 Claims, 3 Drawing Figures

ARRANGEMENT IN A TUNABLE HIGH FREQUENCY TRANSMITTER TUBE

BACKGROUND OF THE INVENTION

The invention relates to an arrangement for transmission of a predetermined frequency by means of a tunable high frequency transmitter tube, such as a magnetron comprising a rotatably journalled tuning body and a stator part. The body, by its rotation in a given first direction, produces a periodically repeated continuous variation of the tuning frequency of the tube. The arrangement comprises a mechanical locking device between the rotatable tuning body and the stator part, which device is inoperative in case of rotation in the first direction, but which operates upon rotation in the opposite direction to lock the the tuning body in an angular position relative to the stator part, which position corresponds to the predetermined fixed frequency.

An arrangement of this kind is described in Swedish Pat. No. 349303. The locking device here consists of a locking hook swingably journalled on the stator part and adapted to cooperate with a locking disc connected to the tuning body and having a locking notch, into which the locking hook can fall for locking the disc and thereby the tuning body upon rotation of the body in the operative direction of the locking device. For switching the locking hook between operative and inoperative position, the hook is frictionally controlled from the rotating body by means of one or more frictional springs bearing against the locking disc, so that the locking hook upon rotation of the body in one direction is swung to the inoperative position and upon rotation in the opposite direction is swung towards the locking disc for engaging the locking notch. The locking hook is thereafter maintained in engagement in the locking notch by continuously applying torque to the tuning body in the last direction.

A drawback of this known arrangement is that for its switching function it requires continuous friction between the springs and the locking disc. This appears to result in a rapid wear-out of the springs, i.a. metallic particles produced by the wear can penetrate into the journal bearings of the rotation body, whereby the life length of the tube is heavily reduced.

In order to avoid this a construction was developed and used, which construction had the same principle shape as the described one but in which the frictional springs were replaced by a spring influencing the locking hook for steadily urging the hook towards the locking disc with the locking notch. In normal operation, when the tuning body rotates with high speed, the locking hook then for each revolution will slip over the cam surface preceeding the locking notch on the locking disc and in a snapwise manner fall into the locking notch. Also in this case there will be a certain amount of wear of the cam surface and the stop surface of the locking notch. This construction has proved to give a life length corresponding to approximately 5000 reversing actions in normal use of the tube. A drawback of this construction is that it is not free of maintenance as it requires lubrication.

SUMMARY OF THE INVENTION

An object of the invention is to propose an arrangement of the kind described in the first paragraph, which has an appreciably larger life length than the known constructions and which is free of maintenance and simpler to assemble than the known ones.

According to the invention this is achieved by means of an arrangement including a mechanical locking device comprising a locking hook, which is pivotably mounted on a part connected to the rotatable tuning body, and a hooking contacting surface situated outside the motion path of the locking hook and connected to the stator part or a part fixed relative to the stator part. When operative, the locking hook is urged with its active end against the hook contacting surface. The locking hook is provided with a counter weight situated on the opposite side of the pivot axis relative to the active end. The counter weight is so dimensioned that the locking hook, in case of normal rotation of the tuning body, is pivoted to a position (by the influence of the centrifugal force on the counter weight) in which it is free from the locking means, while in case of a lower rotational speed it is pressed against the hook contacting surface.

This construction has the advantage that the parts included in the locking device in normal operation of the tube are not in contact with each other whatsoever. Only during the acceleration phase and the retardation phase the locking hook will come into contact with the locking means. This means a small wearing of the parts and results in a life length corresponding to approximately 50000 reversing actions in normal use of the tube, thus achieving a ten-fold improvement of the life length. As a result of the fact that the locking hook included in the locking device is in rest in normal operation of the tube it does not require lubrication, which facilitates the handling of the tube.

BRIEF DESCRIPTION OF THE DRAWINGS

An embodiment of the invention is illustrated in the accompanying drawing in which.

DESCRIPTION OF THE PREFERRED EMBODIMENT

Figure 1:
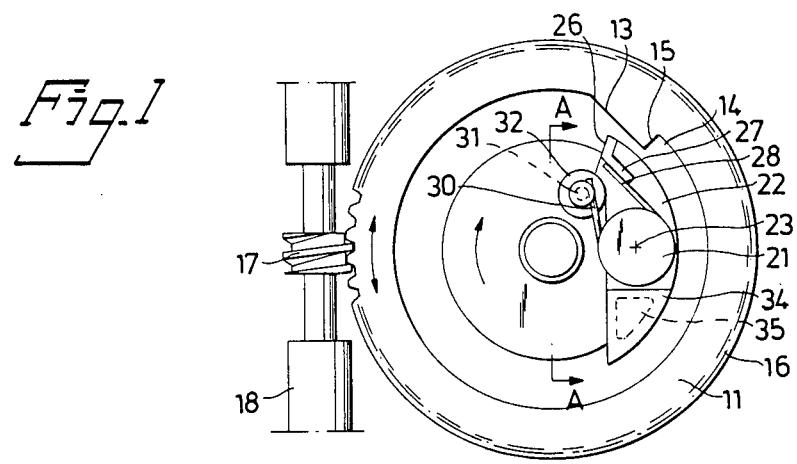
FIGS. 1 and 2 show plan views of the mechanical locking device according to the invention in two different operation modes, FIG. 1 showing the locking device in inactive condition and FIG. 2 in active condition

It is assumed that the shown locking device is mounted at the end of a magnetron (not shown) having a rotatable tuning body for periodically varying the tuning of the magnetron, e.g. as described in the Swedish Pat. No. 199364. The rotatable tuning body is driven by a motor, the shaft of which is designated 10. The locking device consists of two parts, a first stationary part 11 connected to the stator of the magnetron and a second rotatable part 12, which is fastened to the motor shaft 10 and rotates together with the tuning body.

The stationary part 11 is formed by a ring-shaped cam disc having a cam 13 defining a locking notch 14 with a stop surface. At its circumference the ring-shaped locking disc 11 is provided with gear teeth 16 cooperating with a drive gear 17. The drive gear 17 is mounted on a tuning shaft 18 which can be rotated by an adjustment motor for adjusting the angular position of the stop surface 15 relative to the rotation axis 0.

The second, rotatable part 12 of the locking device comprises a carrier in shape of a wheel 19 which is fastened to the motor shaft 10 by means of a pin 20. The wheel 19 supports a pivot 21 on which a locking hook 22 is mounted so that it is pivotable about an axis 23. At one of its ends the hook has a raised angular rim 24, one leg 25 of which defines a stop surface 26 adapted to cooperate with the stop surface 15 on the stationary part 11. The other leg 27 of the raised part 24 forms a bearing surface for one end 28 of a helical spring 29 wound around a central part of the locking hook 22 and the other end 30 of which bears against a pin 31 projecting from the carrier wheel 19. The spring 29 is pre-tensioned such that the active end of the hook comprising the stop surface 26 is pressed towards the cam disc 11 it the locking notch 14. The lower part 32 of the pin 31 serves as a stop for the locking hook and cooperates with a stop surface 33 on the locking hook in one end position of the same.

According to the invention the locking hook continues in a part 34 situated at the opposite side of the swinging axis 23 relative to the active end with the locking surface 26 and in this part 34 there is a counter weight 35. Upon rotation of the wheel 19 with the pivotable locking hook 22 the centrifugal force influencing the counter weight 35 will counter-act the force from the spring 29. The entire locking hook can be moulded in a plastic material and the counter weight 35 then moulded into the plastic material. The counter weight 35 is so dimensioned relative to the force from the spring 29 that the centrifugal force influencing the counter weight will exceed the spring force at a rotational speed, which is below the normal speed range of the motor. If the rotational speed of the motor in jumping freqency mode can vary between 2800 and 4000 r.p.m. the counter weight can be so dimensioned that the spring force is exceeded at approximately 2000 r.p.m.

As described in the Swedish Pat. No. 340303 the motor is of such type that it can reverse its torque by a simple switching operation.

Figure 2:
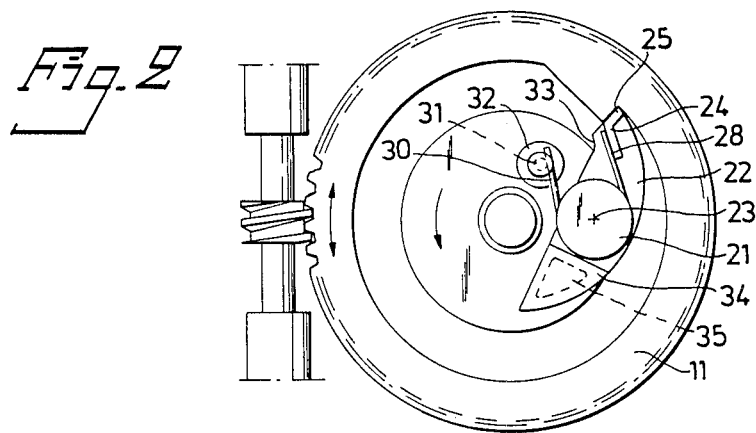
Figure 3:
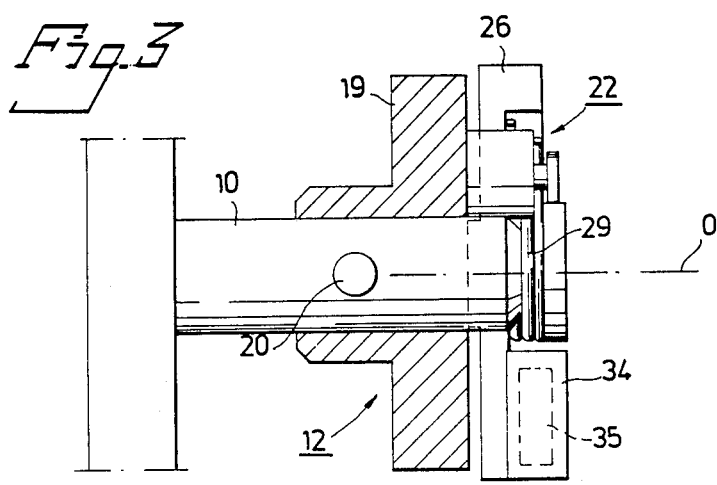
FIG. 3 shows a sectional view taken along the line A—A in FIG. 1.

The function is as follows:

When the magnetron is operated in the jumping frequency mode the motor is accelerated in the direction indicated by the arrow in FIG. 1. Just before the rotor has arrived at its normal speed range the centrifugal force influencing the counter weight 35 will exceed the spring force and the locking hook assumes the position with the stop surface 33 bearing against the stop pin 32, as shown in FIG. 1. This condition, in which the locking hook is free from the locking disc, is maintained as long as the rotor operates in its normal speed range. When the magnetron is operated at a fixed frequency the motor is reversed so that it produces a torque in the direction indicated by the arrow in FIG. 2. The rotor then is decelerated and at a certain speed the spring force will exceed the centrifugal force and the locking hook will come in contact with the locking disc. The torque is maintained in the opposite direction, whereby the rotatable body after passing the speed zero and changing rotational direction will be locked in the locking position shown in FIG. 2. This position represents a given fixed frequency, which can be adjusted by rotation of the tuning shaft 18.

What is claimed is:

1. An arrangement for transmitting a predetermined frequency, said arrangement including a high frequency transmitter tube comprising a stator and a tuning body rotatably attached thereto such that rotation thereof effects a periodically repeated continuous variation of the tuning frequency of the tube, said arrangement further including a mechanical locking device for interlocking the stator and the tuning body, said locking device comprising:

(a) a cam member attached to the stator, said cam member being positionally adjustable around an axis of rotation of the tuning body and including a ramp surface and a stop surface;

(b) a locking hook pivotably mounted to the tuning body and including first and second ends situated along different radii extending from a pivot thereof, the first end having a locking member disposed to enable contact with the cam member when said first end is pivoted toward said member, and the second end having a counterweight for producing a force to pivot the first end away from the cam member when the tuning body is rotated; and (c) a spring member attached to the locking hook for urging the first end of said hook toward the cam member;

said counterweight providing sufficient force to prevent the first end of the locking hook from contacting the cam member when the tuning body is rotated above a predetermined speed;

said cam member being shaped such that at speeds lower than said predetermined speed, the first end slidably contacts the ramp surface when the tuning body is rotated in one direction but is stopped against the stop surface when the tuning body is rotated in the opposite direction, thereby stopping rotation of the tuning body; and said arrangement transmitting a frequency determined by the angular position of the cam member when the tuning body is stopped.

2. An arrangement as in claim 1 where the cam member is located radially outward of the locking hook, with respect to said axis of rotation of the tuning body.

* * * * *

UNITED STATES PATENT AND TRADEMARK OFFICE
CERTIFICATE OF CORRECTION

PATENT NO. : 4,613,788

DATED : September 23, 1986

INVENTOR(S) : Klas I. Blomqvist

It is certified that error appears in the above-identified patent and that said Letters Patent is hereby corrected as shown below:

Column 4, line 40, after "that" insert a comma.

Signed and Sealed this

Sixteenth Day of December, 1986

Attest:

DONALD J. QUIGG

Attesting Officer      Commissioner of Patents and Trademarks